US010661758B2

(12) United States Patent
Jarasson et al.

(10) Patent No.: US 10,661,758 B2
(45) Date of Patent: May 26, 2020

(54) CONNECTION MODULE FOR A WIPER DEVICE OF A MOTOR VEHICLE

(71) Applicant: Valeo Systèmes d'Essuyage, Le Mesnil Saint Denis (FR)

(72) Inventors: Jean-Michel Jarasson, Le Mesnil Saint Denis (FR); Vincent Izabel, Le Mesnil Saint Denis (FR); Gérald Caillot, Le Mesnil Saint Denis (FR); Thomas Vuillardot, Le Mesnil Saint Denis (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 190 days.

(21) Appl. No.: 15/787,786

(22) Filed: Oct. 19, 2017

(65) Prior Publication Data

US 2018/0111588 A1    Apr. 26, 2018

(30) Foreign Application Priority Data

Oct. 20, 2016    (FR) ..................... 16 60164

(51) Int. Cl.
*B60S 1/40* (2006.01)
*B60S 1/52* (2006.01)
*B60S 1/38* (2006.01)

(52) U.S. Cl.
CPC ............. *B60S 1/40* (2013.01); *B60S 1/3805* (2013.01); *B60S 1/3862* (2013.01); *B60S 1/524* (2013.01);
(Continued)

(58) Field of Classification Search
CPC ...... B60S 1/3805; B60S 1/381; B60S 1/3862; B60S 1/40; B60S 1/524; B60S 2001/4054
See application file for complete search history.

(56) References Cited

U.S. PATENT DOCUMENTS 6,836,924 B2 * 1/2005 Egan-Walter ........... B60S 1/381
15/250.04
2012/0117746 A1 * 5/2012 Egner-Walter ........ B60S 1/3805
15/250.06
(Continued)

FOREIGN PATENT DOCUMENTS

DE    10 2010 052314 A1    5/2012
DE        102010052309 A1    5/2012
(Continued)

OTHER PUBLICATIONS

Preliminary Report Issued in Corresponding French Application No. 1660164, dated Jun. 15, 2017 (6 Pages).

*Primary Examiner* — Marc Carlson
(74) *Attorney, Agent, or Firm* — Osha Liang LLP

(57) ABSTRACT

The invention relates to a connection module 10 for a wiper device 1 of an outer surface 20 of a window 2 of a motor vehicle intended to be arranged between a windscreen wiper 30 and a driving arm 60, the connection module 10 comprising a hydraulic connector 12 and an electrical connector 14, one of the hydraulic 12 and electrical 14 connectors, called first connector, comprising at least one longitudinal electrical or hydraulic routing channel 120, the other of the hydraulic 12 and electrical 14 connectors, called second connector, comprising two longitudinal electrical or hydraulic routing channels 120, the connection module 10 being characterized in that the first connector is at least partially arranged laterally between the two longitudinal routing channels of the second connector.

13 Claims, 7 Drawing Sheets

(52) U.S. Cl.
CPC ........ *B60S 1/381* (2013.01); *B60S 2001/4054* (2013.01)

(56) References Cited

U.S. PATENT DOCUMENTS

| | | | | |
|---|---|---|---|---|
| 2012/0192375 A1* | 8/2012 | Cathala | ................... | B60S 1/488 15/250.02 |
| 2013/0097801 A1* | 4/2013 | Schaeuble | ............ | B60S 1/3805 15/250.32 |
| 2013/0291328 A1* | 11/2013 | Schmid | ................ | B60S 1/3805 15/250.04 |
| 2014/0317871 A1* | 10/2014 | Caillot | .................. | B60S 1/3805 15/250.06 |
| 2015/0375718 A1* | 12/2015 | Jarasson | ................. | B60S 1/488 219/202 |
| 2017/0072910 A1* | 3/2017 | Cros | .................... | B60S 1/3805 |
| 2017/0203726 A1* | 7/2017 | Poton | ................... | B60S 1/0408 |
| 2017/0225661 A1* | 8/2017 | Shimoyama | .......... | B60S 1/3415 |
| 2017/0273144 A1* | 9/2017 | Caillot | ................. | B60S 1/3805 |

FOREIGN PATENT DOCUMENTS

| | | | |
|---|---|---|---|
| EP | 2460700 A1 | 6/2012 | |
| EP | 2460700 B1 | 7/2013 | |

* cited by examiner

CONNECTION MODULE FOR A WIPER DEVICE OF A MOTOR VEHICLE

FIELD OF THE INVENTION

The invention relates to the technical field of equipment for motor vehicles and in particular equipment for wiping windows of the motor vehicle. More particularly, the invention relates to a connection module for a wiper device of a motor vehicle.

TECHNICAL BACKGROUND OF THE INVENTION

A connection module is a module arranged at a junction between a driving arm and a windscreen wiper belonging to a wiper device.

A connection module makes it possible to provide a hydraulic coupling and an electrical coupling between the driving arm and the windscreen wiper. To this end, the connection module can comprise an electrical connector and a hydraulic connector. The electrical and hydraulic connectors comprise routing channels. The electrical connector generally comprises two routing channels for electrical current, which are cables or electrical wires. Depending on the nature of the wiper device, the hydraulic connector comprises one or two routing channels, which are for example pipes.

According to a known design of such a connection module, as for example illustrated in the document EP2460700 B1, the hydraulic connector and the electrical connector are arranged one on top of the other in an interior space of the connection module such that the hydraulic channels extend substantially above the electrical channels or vice versa.

This type of connection module, with this arrangement, presents the drawback of extending significantly heightwise, the height being measured substantially along a normal to the outer surface of the windscreen passing through the connection module when the wiper device is assembled on the motor vehicle. One notable consequence of this arrangement is an obstruction of the visibility of a driver of the motor vehicle. Another consequence is the reduction of the aerodynamic efficiency of the windscreen wiper by degradation of the lift and of the drag due to the height of the connection module.

There is a need to reduce the bulk created by the hydraulic and electrical connectors, particularly in order to improve the visibility of the drivers.

SUMMARY OF THE INVENTION

To do this, the invention proposes a connection module for a wiper device of an outer surface of a window of a motor vehicle intended to be arranged between a windscreen wiper and a driving arm, the connection module comprising a hydraulic connector and an electrical connector, one of the hydraulic and electrical connectors, called first connector, comprising at least one longitudinal electrical or hydraulic routing channel, the other of the hydraulic and electrical connectors, called second connector, comprising two longitudinal electrical or hydraulic routing channels, the connection module being characterized in that the first connector is at least partially arranged laterally between the two longitudinal routing channels of the second connector.

This arrangement of the longitudinal routing channels of the hydraulic and electrical connectors makes it possible in particular to reduce the height of the connection module and therefore the part of the connection module visible by the driver of the motor vehicle.

Another subject of the invention is a windscreen wiper consisting of a wiper blade and a reinforcement, characterized in that it comprises a connection module as defined above.

According to different aspects of the invention which will be able to be taken together or separately:
  at least one longitudinal routing channel of the first connector is at least partially arranged laterally between the two longitudinal routing channels of the second connector,
  the two longitudinal routing channels of the second connector extend substantially parallel to one another,
  the at least one longitudinal routing channel of the first connector is entirely arranged laterally between the two longitudinal routing channels of the second connector,
  the first connector comprises two longitudinal routing channels, the two longitudinal routing channels of the first connector are parallel to one another,
  the longitudinal routing channels of the first and second connectors each extend longitudinally along a main extension axis,
  the main extension axis of each of the at least one longitudinal routing channel of the first connector, over at least a part of its length, coincides or substantially coincides with a plane P1,
  the main extension axes ($X_1$, $X_2$) of the longitudinal routing channels of the second connector, at least over a part of their lengths, coincide or substantially coincide with a plane P2,
  the planes $P_1$ and $P_2$ are orthogonal or substantially orthogonal,
  the planes $P_1$ and $P_2$ are parallel or substantially parallel,
  the planes $P_1$ and $P_2$ coincide or substantially coincide,
  the planes $P_1$ and $P_2$ are secant,
  the first connector is the electrical connector,
  the second connector is the hydraulic connector,
  the first connector is the hydraulic connector,
  the second connector is the electrical connector.

BRIEF DESCRIPTION OF THE FIGURES

The invention will be better understood, and other aims, details, features and advantages thereof will become more clearly apparent from the following detailed explanatory description, of at least one embodiment of the invention given as a purely illustrative example, with reference to the attached figures in which:

FIG. 6 is a perspective view of the part of the wiper device illustrated in the preceding figure and represented without the reinforcement of the connection module.

FIG. 13 is a cross-sectional view of a connection module according to a fifth embodiment according to the invention, the connection module being represented mounted on the windscreen wiper.

In an illustrative and nonlimiting manner, and without reference to the Earth's gravity, three axes L, V and T referring to the trihedron L, V, T represented in the figures, will be used hereinafter in the description.

Figure 1:
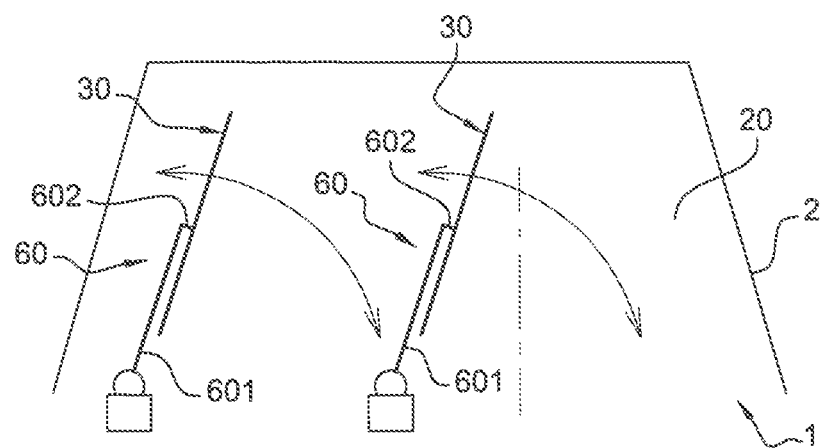
FIG. 1 is a schematic view of a windscreen of a motor vehicle provided with a wiper device with two windscreen wipers of which at least one is provided with a connection module according to the invention.

As illustrated in FIG. 1, the invention relates to a wiper system 1 for a motor vehicle. The wiper system 1 here comprises two wipers, each of which comprises a driving arm 60 and a windscreen wiper 30. The wiper system 1 is designed to clean the outer surface 20 of the windscreen 2 of the motor vehicle. In a variant, the window 2 of the motor vehicle can for example be a rear window of the motor vehicle equipped with at least one wiper.

The driving arm 60 here comprises a first longitudinal end 601, called proximal end, and a second longitudinal end $02, called distal end. The driving arm 60 extends longitudinally in a main longitudinal direction of extension from its proximal end 601 to its distal end 602.

Figure 2:
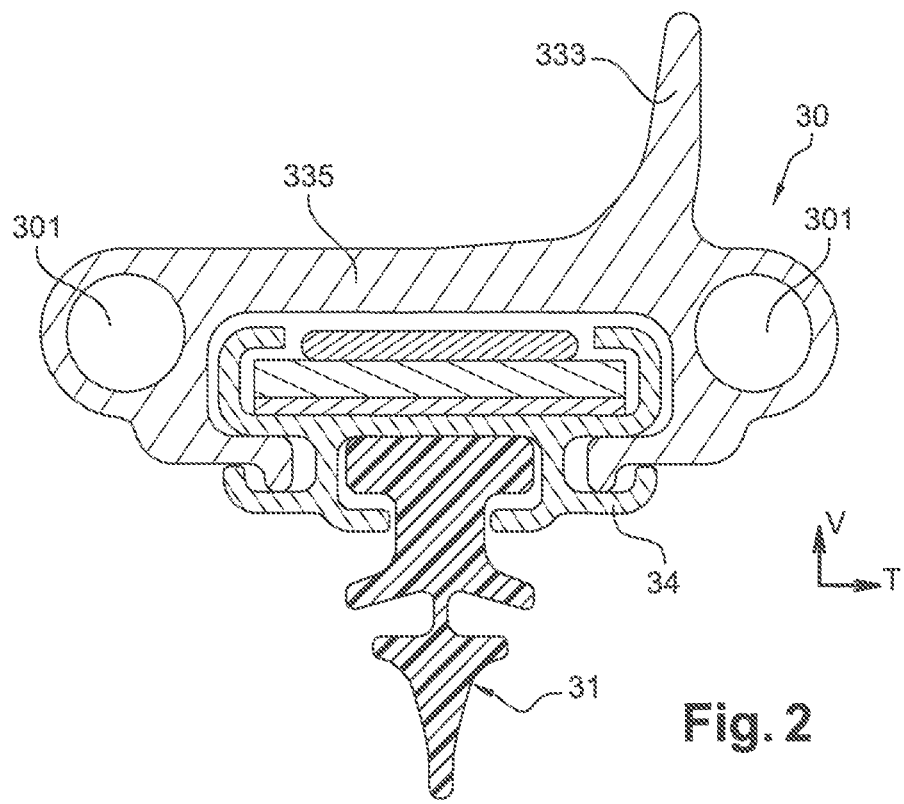
FIG. 2 is a cross-sectional view of a windscreen wiper of the wiper device of FIG. 1.

As illustrated in FIG. 2, the windscreen wiper 30 comprises a first longitudinal end and a second longitudinal end. It extends longitudinally in a main longitudinal direction of extension from the first longitudinal end to the second longitudinal end. Note that the main longitudinal direction of extension of the windscreen wiper is parallel to the axis L.

The windscreen wiper 30 comprises an upper part and a lower part, assembled to one another. The upper and lower parts both extend longitudinally in the main longitudinal direction of extension of the windscreen wiper 30.

The windscreen wiper is represented with a single reinforcing spine. As a variant, it can comprise two reinforcing spines.

The lower part of the windscreen wiper 30 here comprises a wiper blade 31 and a reinforcement 34. The reinforcement 34 serves in particular as a housing for the wiper blade 31.

The wiper blade 31 is designed to be in contact with the outer surface 20 of the window 2 so as to wipe the latter in a to-and-fro movement of the windscreen wiper 30 along the window 2.

The upper part is here composed of an aerodynamic baffle 333, of a covering part 335 and two distribution ducts 301.

The covering part 335 extends longitudinally from one longitudinal end to the other of the windscreen wiper 30. It is arranged on top of the reinforcement 34 of the windscreen wiper 30 so as to cover at least a part thereof.

The aerodynamic baffle 333 is designed to hold the windscreen wiper 30 against the outer surface 20 of the window 2 when the motor vehicle is moving at a high speed. The aerodynamic baffle 333 consists of a raised edge of the upper part of the windscreen wiper 30. Here, it is derived from the covering part 335.

The distribution ducts 301 of the windscreen wiper 30 are designed to allow the circulation and the distribution onto the window 2 of a liquid, in particular a cleaning liquid for the window 20. The cleaning liquid is for example stored in a tank situated in an engine compartment of the motor vehicle. The tank can comprise a pump which then makes it possible to route the cleaning liquid from the tank to the windscreen wiper 30 via, in particular, the driving arm 60.

The distribution ducts 301 each extend longitudinally in a main longitudinal direction of extension parallel to the longitudinal direction of extension of the windscreen wiper 30. When the distribution ducts 301 are assembled with the rest of the wiper device. It will be noted that their main longitudinal directions of extension are parallel to the axis L. The distribution ducts 301 here allow a distribution of the cleaning liquid on either side of the windscreen wiper 30. That can in particular make it possible to adapt the distribution of cleaning liquid on the window 2 as a function of the direction of movement of the windscreen wiper 30.

The distribution ducts 301 are linked to one another by the covering part 335 which covers the reinforcement 34 of the windscreen wiper 30. The covering part 335 thus serves as a material bridge between the two distribution ducts 301. It will be noted that the covering part 335, the aerodynamic baffle 333 and the two distribution ducts 301 are for example extruded. More specifically, two co-extruded materials are used: a flexible upper material and a more rigid material for the clamping form on the reinforcement 34.

Figure 3:
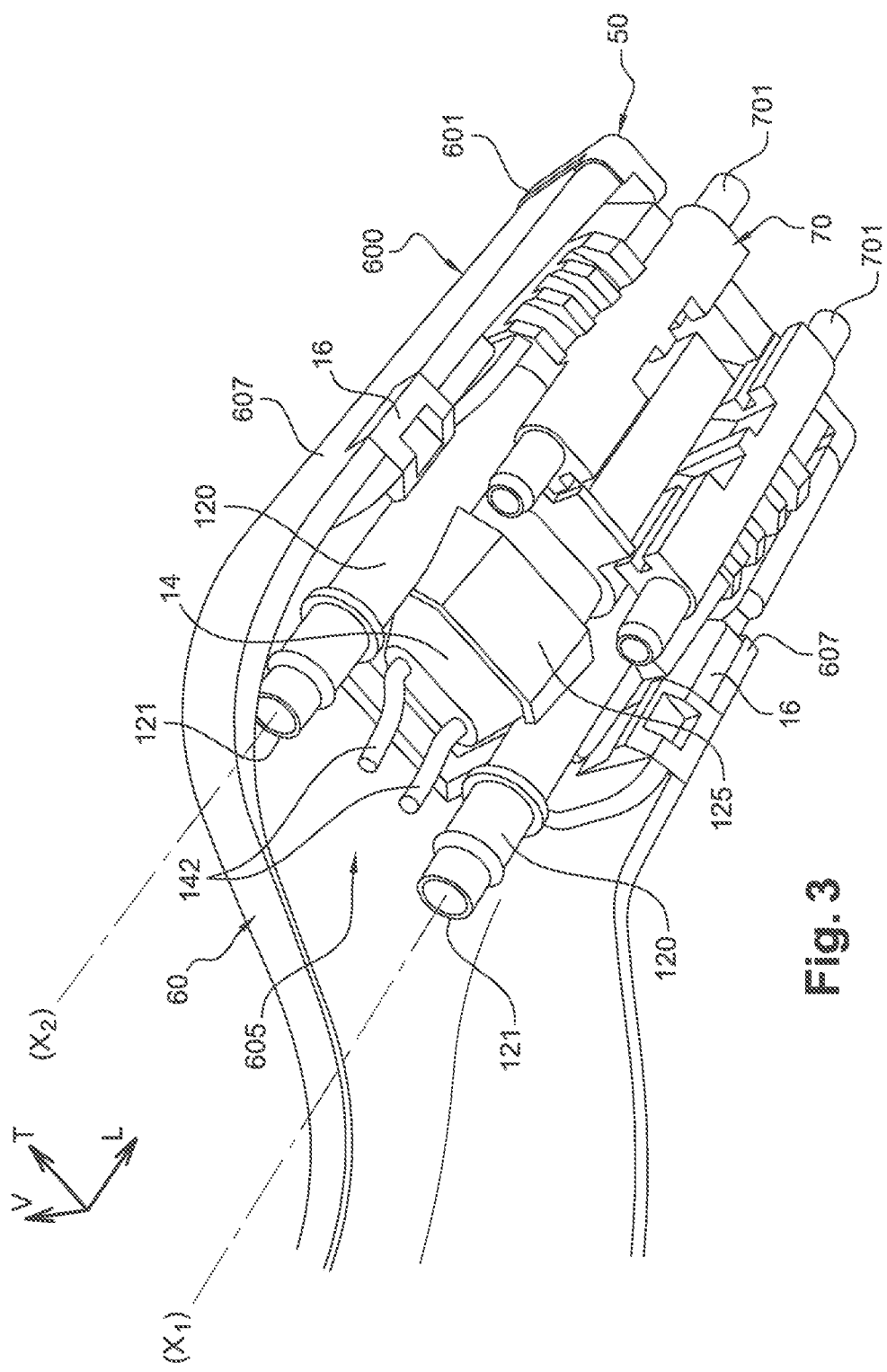
FIG. 3 is a perspective view of a part of the wiper device illustrated in the preceding figures and comprising a connection module according to a first embodiment of the invention.

As illustrated in FIG. 3, the wiper device 1 comprises a connection module 10.

Le connection module 10 here comprises a hydraulic connector 12 and an electrical connector 14. The connection module 10 is intended to be arranged at a junction between the driving arm 60 and the windscreen wiper 30. The connection module 10 allows an electrical connexion and a hydraulic connection between the driving arm 60 and the windscreen wiper 30.

The hydraulic connector 12 is designed to allow a hydraulic connection between the driving arm 60 and the windscreen wiper 30. In particular, the hydraulic connector 12 notably allows the circulation of the cleaning liquid from the driving arm 60 to the distribution ducts 301 of the windscreen wiper 30.

The hydraulic connector 12 comprises at least one longitudinal routing channel 120, here two longitudinal routing channels 120. The longitudinal routing channels 120 of the hydraulic connector 12 are, here, routing ducts 120 through which the cleaning liquid circulates. The routing ducts 120 are ducts made of rigid plastic to which pipes are connected at the inlet zone 121.

The electrical connector 14 is here designed to allow the transmission of an electrical current between electrical wires 142 extending from the driving arm 60 and a device requiring an electrical power supply such as, for example, a resistive film, not illustrated here, of the windscreen wiper 30.

As illustrated in FIGS. 3 to 7, the wiper device 1 further comprises a mechanical connector 70 and an adapter 50.

The mechanical connector 70 and the adapter 60 are both designed to allow the driving of the windscreen wiper 30 by the driving arm 60. In particular, the mechanical connector 70 and the adapter 50 are designed to allow the windscreen wiper 30 to be fitted together with the driving arm 60.

As can be seen in particular in FIG. 3, the driving arm 60 comprises, at its distal end 602, a connection cap 600. In other words, the driving arm 60 is terminated at its distal end 602 by the connection cap 600. The connection cap 600 is designed to allow the driving arm 60 to be fitted together with the windscreen wiper 30. Once assembled with the rest of the wiper device 1, the connection cap 600 covers the connection module 10, the mechanical connector 70, the adapter 50 and a part of the windscreen wiper 30.

The connection cap 600 extends longitudinally in the main longitudinal direction of extension of the driving arm 60, it will be noted that the connection cap 600 here has a cross section, the cross section being notably orthogonal to the main longitudinal direction of extension of the driving arm 60 that is substantially U-shaped.

In particular, the connection cap 600 comprises a flat part 605 and two lateral branches 607, each lateral branch 607 extending substantially at right angles form the flat part 605. It will be noted that the cross section of each of the lateral branches 607 of the connection cap 600 corresponds to one of the branches of the U formed by the cross section of the connection cap 600.

It will be noted that each lateral branch 607 of the connection cap 600 is provided with a zone stripped of material intended to allow a mechanical cooperation with the connection module 10.

The adapter 50 is designed to be inserted then housed at least partially inside the connection cap 600 of the driving arm 60. In particular here, the adapter 50, once assembled with the driving arm 60, is designed to be arranged between the two lateral branches 607 of the connection cap 600.

Figure 4:
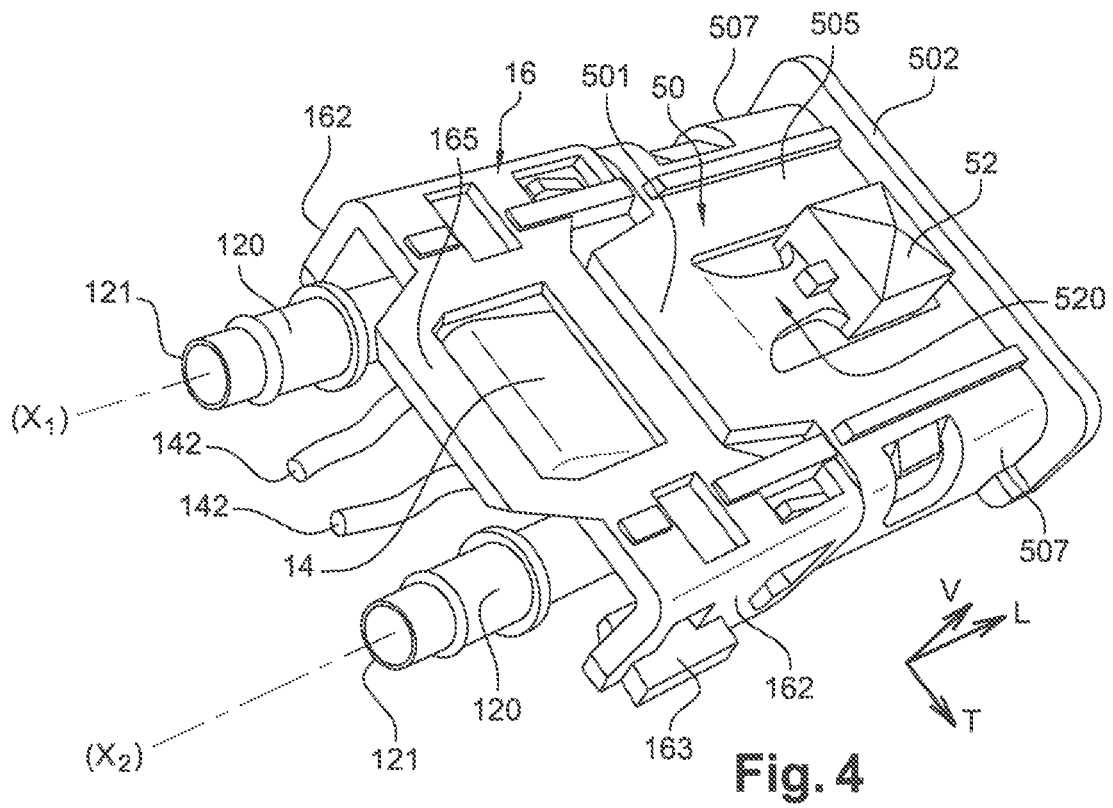
FIG. 4 is a perspective view of the part of the wiper device illustrated in the preceding figure and represented without the driving arm.

As can be seen in FIG. 4, the adapter 50 comprises a first longitudinal end 501 and a second longitudinal end 502 and extends longitudinally from one to the other in a main longitudinal direction of extension. When the adapter 50 is assembled with the rest of the wiper device, the main longitudinal direction of extension of the adapter 50 is parallel to the axis L. The adapter 50 has a cross section that is substantially U-shaped. It comprises two lateral walls 507 and a flat part 505 which links the two lateral walls 507 of the adapter to one another. The two lateral walls 507 here extend orthogonally to the flat part 505, in other words, the flat part 505 of the adapter 50 serves as a material bridge between the two lateral walls 507 of the adapter 50.

The adapter 50 is designed to be arranged on top of the mechanical connector 70, between the latter and the connection cap 600 of the driving arm 60. Note that the connection cap 600 here serves as housing for the adapter 50 which covers the mechanical connector 70. In particular, the adapter 50 is designed to cooperate mechanically both with the mechanical connector 70 and with the connection cap 600 of the driving arm 30.

Note that the adapter 50 is provided on its flat part 505 with a flexible leaf 520 at the free end of which is arranged a locking knob 52.

The locking knob 52 is designed to cooperate mechanically with an orifice, not represented in the figures, of the connection cap 600 of the driving arm 60. The locking knob 52, also called locking orifice 52, allows the adapter 50 to be held in position in relation to the connection cap 600 of the driving arm 60. Note that the locking knob 52 and the lateral branches 507 of the adapter 50 protrude in mutually orthogonal directions of protuberance.

The adapter 50 is designed to be secured to the mechanical connector 70 of the windscreen wiper 30. Note, once secured to the mechanical connector 70, the adapter 50 partly covers the latter. In particular here, once assembled with the adapter 50, the mechanical connector 70 is arranged between the two lateral walls 507 of the adapter 50.

The mechanical connector 70 is designed to be assembled and secured ultimately to the windscreen wiper 30. In particular, the mechanical connector 70 is designed to be secured in particular to the reinforcing spine which is inserted into the reinforcement 34 of the windscreen wiper 30. Once assembled with the windscreen wiper 30, the mechanical connector 70 extends longitudinally in a main longitudinal direction of extension substantially coinciding with the main longitudinal direction of extension of the windscreen wiper 30. In other words, once assembled with the rest of the wiper device, the mechanical connector 70 extends longitudinally in a direction parallel to the axis L.

Figure 5:
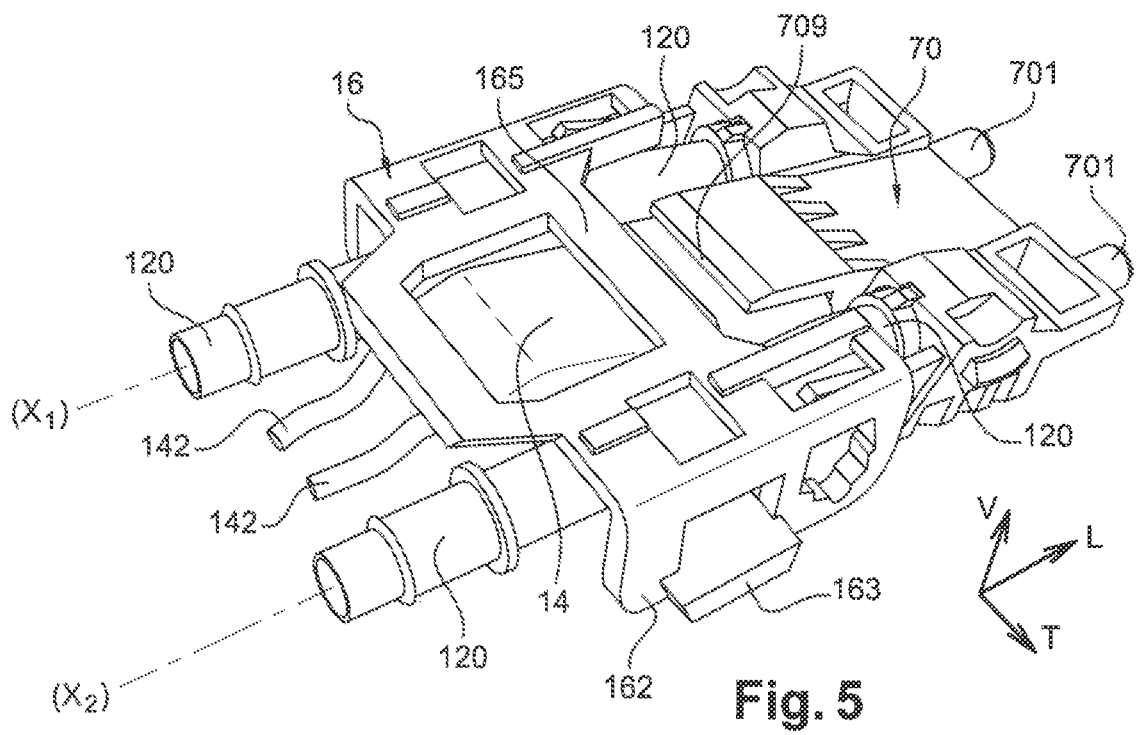

As is illustrated in particular in FIGS. 4 and 5, the connection module 10 further comprises a reinforcement 16. The reinforcement 16 of the connection module 10 is designed in particular to serve as a housing and/or support for the hydraulic connector 12. In a broader sense, it is for example designed to cooperate mechanically at the same time with the hydraulic connector 12, the connection cap 600 of the driving arm 60 and the mechanical connector 70.

Note that, once assembled with the rest of the wiper device 1, the mechanical connector 70 and the connection module 10 are arranged substantially one behind the other along the main longitudinal direction of extension of the windscreen wiper 30. In other words, the mechanical connector 70 and the connection module 10 are designed to be arranged substantially one behind the other in a direction parallel to the axis L.

The reinforcement 16 is designed to be arranged and fixed inside the connection cap 600 of the driving arm 60. Note that the reinforcement 16 here comprises a material bridge 165 and two lateral walls 162 linked to one another by the material bridge 165. The lateral walls 162 of the reinforcement 16 extend substantially orthogonally to the material bridge 165 and from the latter. Note also that, once assembled with the rest of the wiper device 1 and observed in the main longitudinal direction of extension of the windscreen wiper, the reinforcement 16 is substantially U-shaped.

As can be seen in particular in FIGS. 4 and 5, the lateral walls 162 of the reinforcement 16 are each provided with a protuberance 163 which protrudes outwards from the U formed by the reinforcement 16, in other words, the two protuberances 163 protrude laterally and outwards from the lateral walls 162 of the reinforcement 16. The protuberances 163 of the connection module are provided to cooperate mechanically with the zones stripped of material of the lateral walls 607 of the connection cap 600. The protuberances 163 make it possible in particular to hold the reinforcement 16 in position in relation to the driving arm 60.

Figure 6:
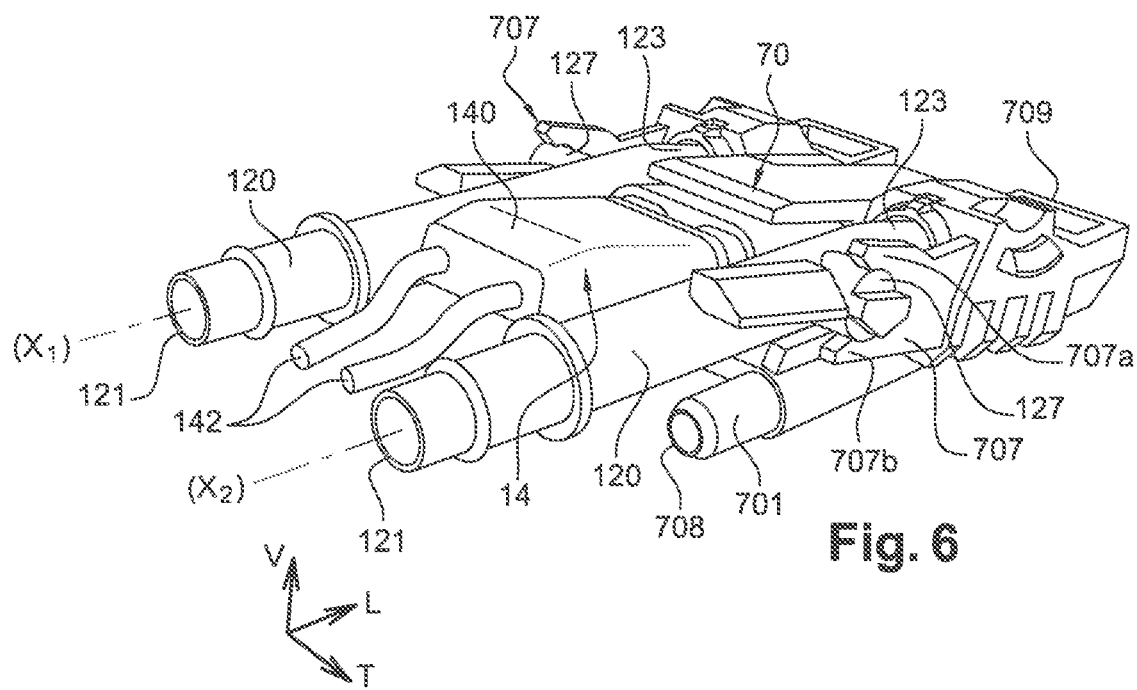
FIG. 6 is a perspective view of the part of the wiper device illustrated in the preceding figure and represented without the adapter.

As can be seen in particular in FIGS. 5 and 6, the mechanical connector 70 extends longitudinally in a main longitudinal direction of extension of the mechanical connector 70 between a first longitudinal end 708 and a second longitudinal end 709, from one to the other. Note that the mechanical connector 70 has a generally substantially parallelepiped outer form. The main longitudinal direction of extension of the mechanical connector 70 is parallel to the axis L when the mechanical connector 70 is assembled with the rest of the wiper device.

Note that the reinforcement 16 of the connection module 10 and the mechanical connector 70 are designed to be substantially positioned one behind the other along the main longitudinal direction of extension of the windscreen wiper 30. In other words, the reinforcement 16 and the mechanical connector 70 are designed to be substantially positioned one behind the other in a direction parallel to the axis L.

Once the mechanical connector 70 is assembled with the rest of the wiper device, the mechanical connector 70 is designed such that its main longitudinal direction of extension is parallel to the main longitudinal direction of extension of the windscreen wiper 30. In other words, once the mechanical connector 70 is assembled with the rest of the wiper device, the main longitudinal direction of extension of the mechanical connector 70 is parallel to the axis L.

The mechanical connector 70 comprises two inner ducts, not visible in the figures, and two outer ducts 701.

The inner ducts extend here parallel to one another inside the mechanical connector 70. They are designed to be connected on the one hand to the routing ducts 120 of the hydraulic connector 12 and on the other hand to the outer ducts 701 of the mechanical connector 70 which will be described hereinbelow.

Note that the routing ducts 120 of the hydraulic connector 12 are designed to be fitted together and to be inserted over at least a part of their lengths inside the inner ducts of the mechanical connector 70.

The outer ducts 701, for their part, extend parallel to the longitudinal direction of extension of the mechanical connector 70. Here, they each extend from one of the longitudinal ends 708, 709 to the other of the mechanical connector 70. They are designed to be connected both to the distribution ducts 301 of the windscreen wiper 30 and to the inner ducts of the mechanical connector 70. When the mechanical connector 70 is assembled with the rest of the wiper device, the outer ducts 701 extend parallel to the axis L.

Thus, the inner ducts of the mechanical connector 70 make it possible to connect the routing ducts 120 of the hydraulic connector 12 to the distribution ducts 301 of the windscreen wiper 30. In particular, the cleaning liquid initially stored in the tank of the engine compartment circulates in succession through a pipe of the driving arm 60, the routing ducts 120 of the hydraulic connector 12, the inner ducts of the mechanical connector 70, the outer ducts 701 of the mechanical connector 70 and finally inside the distribution ducts 301 of the windscreen wiper 30 before being sprayed onto the outer surface 20 of the window 2.

Note that the distribution ducts 301 of the windscreen wiper 30 are provided, over at least a part of their lengths, with spraying orifices, not represented in the figures, through which 225 the cleaning liquid is distributed over the window 2.

The mechanical connector 70 further comprises a female socket, not visible in the figures, which allows an electrical connection with the electrical connector 14.

Figure 7:
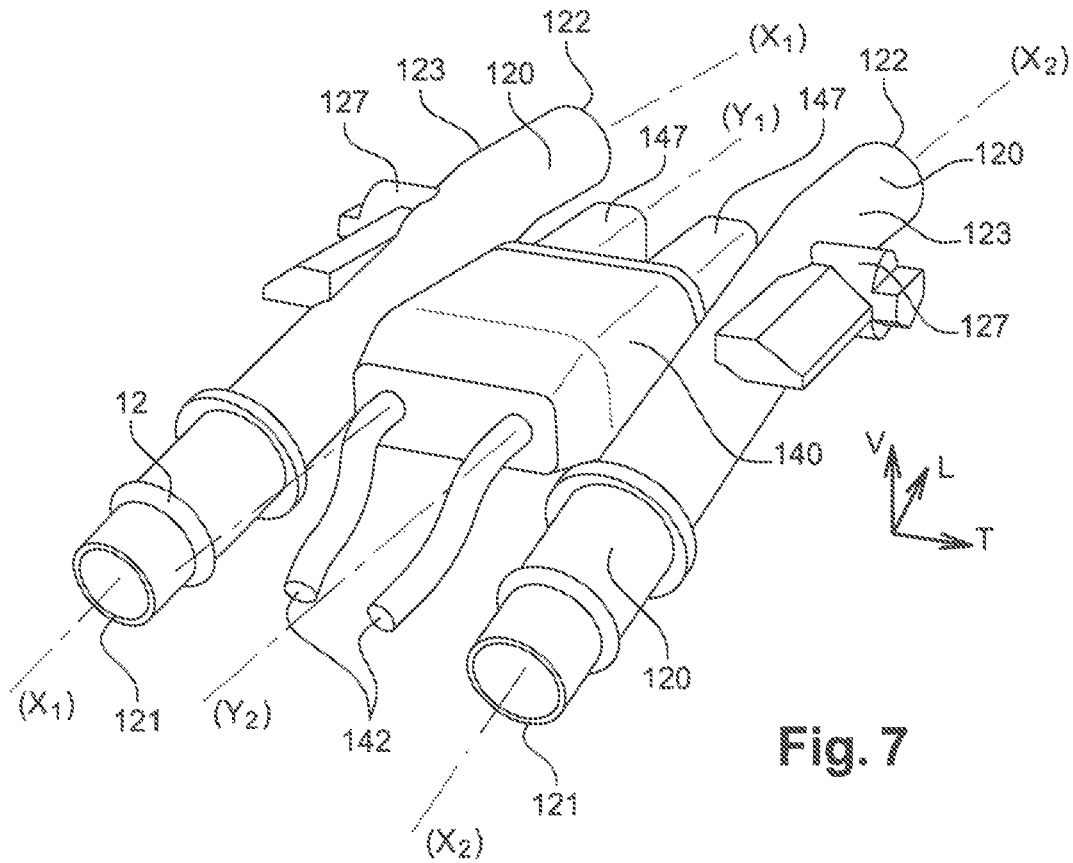
FIG. 7 is a perspective view of the part of the wiper device illustrated in the preceding figure and represented without the mechanical connector.

As can be seen in particular in FIG. 7, the electrical connector 14 comprises an insulating body 140 and two male pins 147. The insulating body 140 is pierced by two longitudinal ducts that are not visible. Each of these longitudinal ducts comprises an electrically conductive material. Furthermore, each of the two inner ducts of the electrical conductor 14 is prolonged by one or the other of the two male pins 147. The two male pins 147 are designed to be connected to the female socket of the mechanical connector 70.

Each of the two longitudinal ducts of the electrical connector and the male pin 147 which prolongs it form together a longitudinal routing channel of the electrical connector 14. The electrical connector 14 thus comprises two longitudinal routing channels which extend here parallel to one another. The longitudinal routing channels of the electrical connector 14 each extend along a main extension of axis ($Y_1$, $Y_2$).

As illustrated in FIGS. 6 and 7, the hydraulic connector 12 is in particular provided with two trunnions 127. The trunnions 127 are designed to cooperate mechanically with the mechanical connector 70. In particular, the trunnions 127 here protrude laterally from one and the other of the routing ducks 120 of the hydraulic connector 12. The trunnions 127 each extend along a main axis substantially orthogonal to the main longitudinal directions of extension of the routing ducts 120 of the hydraulic connector 12.

To allow the mechanical cooperation between the mechanical connector 70 and the hydraulic connector 12, the mechanical connector 70 here comprises two immobilizing means designed to cooperate mechanically with the trunnions 127 of the hydraulic connector 120. As illustrated in particular in FIG. 6, the immobilizing means of the mechanical connector 70 are arms 707 which are arranged on each side of the mechanical connector 70. Each arm 707 itself comprises two longitudinal branches 707a and 707b. The two longitudinal branches 707a and 707b form between them an interstice of substantially circular form intended to accommodate one or other of the trunnions 127 of the hydraulic connector 120. In other words, the two branches 707a and 707b are designed to allow the passage and the insertion between them of one of the trunnions 127 of the hydraulic connector 120.

As illustrated in particular in FIG. 7, each of the routing ducts 120 of the hydraulic connector 12 here extends longitudinally in a main longitudinal direction of extension, called main extension axis ($X_1$, $X_2$), from a first longitudinal end, called input end 121, and to a second longitudinal end, called output end 122. The main extension axes ($X_1$, $X_2$) of the two routing ducts 120 are here parallel or substantially parallel to one another.

Each of the routing ducts 120 has a cross section, the cross section extending at right angles to the main extension axis ($X_1$, $X_2$) of the routing duct 120, which is substantially circular.

On the one hand, each of the routing ducts 120 of the hydraulic connector 12 is designed to be coupled at its input end 121 to a pipe or duct, not represented here, of the driving arm 60. On the other hand, at their output end 122, the routing ducts 120 are designed to be coupled to the mechanical connector 70. In particular, the routing ducts 120 are designed to be coupled at their output end 122 to the inner ducts of the mechanical connector 70, the seal-tightness being ensured by seals between the ducts 120 and the mechanical connector 70.

Note that each of the routing ducts 120 of the hydraulic connector 12 is sometimes referred to by the expression "demi water plugs".

Here, the routing ducts 120 of the hydraulic connector 12 are both bent. Here, consequently, the main extension axes ($X_1$, $X_2$) are not rectilinear. In particular, each routing duct 120 comprises a first rectilinear portion which extends longitudinally from the input end 121 to a bend 123 and a second rectilinear portion which extends longitudinally from the bend 123 to the output end 122. The first and second rectilinear portions of each routing duct 120 thus form a non-zero angle between them.

This design of the routing ducts 120 of the hydraulic connector 12 makes it possible in particular to facilitate the mechanical cooperation between the hydraulic connector 12 and the mechanical connector 70. This design also makes it possible to facilitate the assembly of the connection module 10 with the rest of the wiper device.

As is illustrated in particular in FIG. 3, the hydraulic connector 12 here comprises a material bridge 125. The material bridge 125 of the hydraulic connector 12 extends here between the routing ducts 120 of the hydraulic connector 12 so as to link them to one another. In particular, the material bridge 125 is designed to secure the routing ducts 120 of the hydraulic connector 12 to one another. The securing of the routing ducts 120 makes it possible in particular to facilitate their insertion into the mechanical connector 70. Note that the material bridge 125 is substantially U-shaped with the two branches spreading apart slightly from one another. As a variant, the hydraulic connector 12 can also be directly fixed (welded) to the electrical connector 14, the hydraulic connector 12 then having no material bridge 125.

Furthermore, the material bridge 125 of the hydraulic connector 12 here serves as housing and/or support for the electrical connector 14. In particular here, the insulating body 140 of the electrical connector 14 rests at least partially on the material bridge 125 of the hydraulic connector 12.

According to the invention, at least a part of one of the hydraulic 12 and electrical 14 connectors is at least partially arranged laterally between the two longitudinal routing channels of the other of the hydraulic 12 and electrical 14 connectors.

Here, the electrical connector 14 is at least partially arranged laterally between the two routing ducts 120 of the hydraulic connector 12. Arranged "laterally between" should be understood to mean that there is, when the connection module 10 is assembled with the rest of the wiper device 1, at least one straight line illustrated in FIGS. 8, 11, 12 and 13, such that, cumulatively:
the straight line $D_1$ is orthogonal or substantially orthogonal to the main extension axis $(X_1, X_2)$ of one of the routing ducts 120 of the hydraulic connector 12,
the straight line $D_1$ passes through one of the routing ducts 120 at a first point of intersection $I_A$ and the other of the routing ducts 120 at a second point of intersection $I_B$ and
the straight line $D_1$ passes through at least a part of the electrical connector 14, said part of the electrical connector 14 passed through by the straight line $D_1$ being located between the first point of intersection $I_A$ and the second point of intersection $I_B$.

Hereinbelow, a plane $P_1$ is defined such that the main extension axes $(X_1, X_2)$ of the routing ducts 120 of the hydraulic connector 12 both coincide with the plane $P_1$ at least over a part of their lengths. In particular here, the main extension axes $(X_1, X_2)$ of the routing ducts 120 of the hydraulic connector 12 coincide with the plane $P_1$ between the input end 121 and the bend 123 of each of the routing ducts 120.

Hereinbelow, a plane $P_2$ is also defined such that the main extension axes $(Y_1, Y_2)$ of the longitudinal routing channels of the electrical connector 14 substantially coincide with the plane $P_2$ at least over a part of their lengths. In particular here, the main extension axes $(Y_1, Y_2)$ of the longitudinal routing channels of the electrical connector 14 coincide with the plane P2 over all their lengths.

In the embodiment described hitherto and illustrated in FIGS. 3 to 7, which constitutes a first embodiment, the hydraulic 12 and electrical 14 connectors are arranged such that the planes $P_1$ and $P_2$ are slightly inclined relative to one another. In particular, the planes $P_1$ and $P_2$ intersect such that the intersection between the two planes $P_1$ and $P_2$ consists of a straight line at right angles or substantially at right angles to the main extension axes $(X_1, X_2)$ of the routing ducts 120 of the hydraulic connector 12. Here, note that the plane $P_1$ is parallel to a plane coinciding with the axes L and T.

Figure 8:
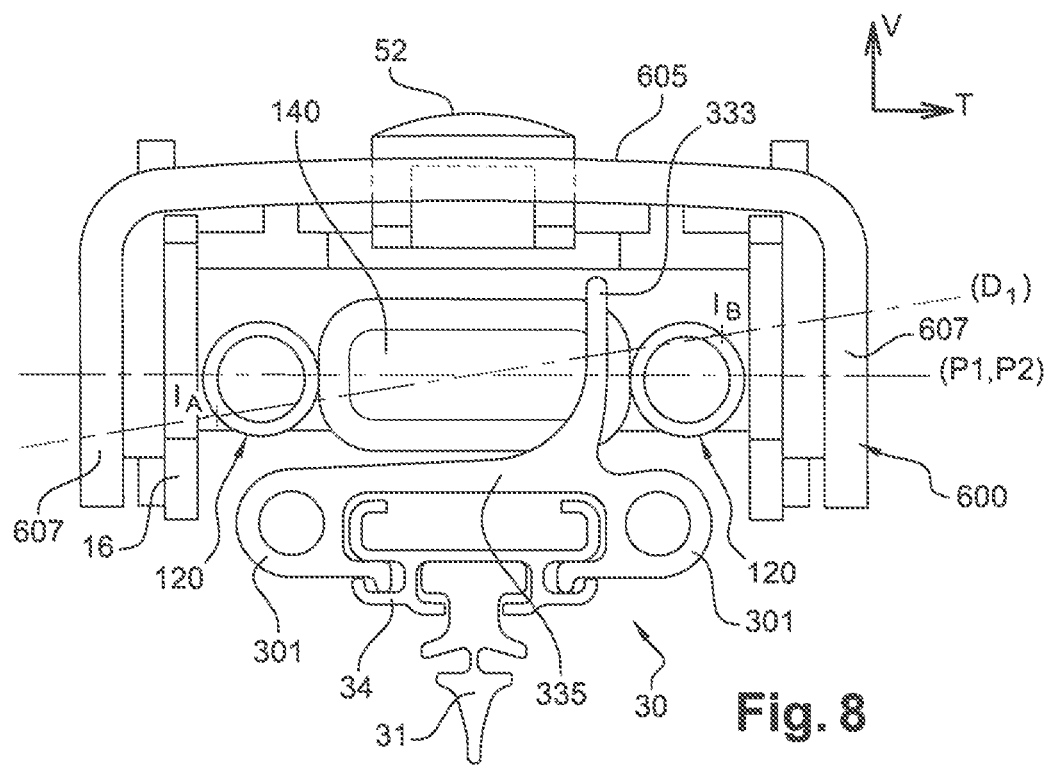

In a second embodiment, illustrated in FIG. 8, in contrast to the preceding embodiment, the hydraulic 12 and electrical 14 connectors are arranged relative to one another such that the planes $P_1$ and $P_2$ coincide with one another. Note that here the planes $P_1$ and $P_2$ are parallel to a plane coinciding with the axes L and T.

Figure 9:
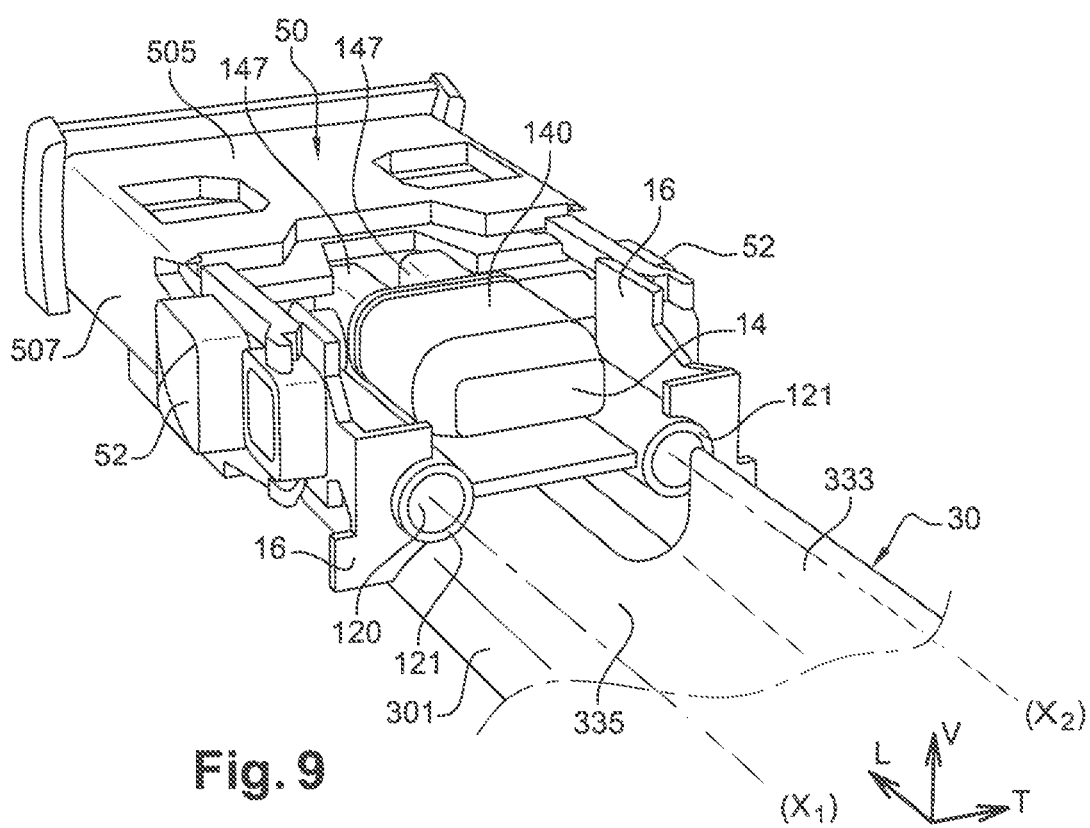
FIG. 9 is a perspective view of a connection module according to a third embodiment of the invention, the connection module being represented mounted on the windscreen wiper.
Figure 10:
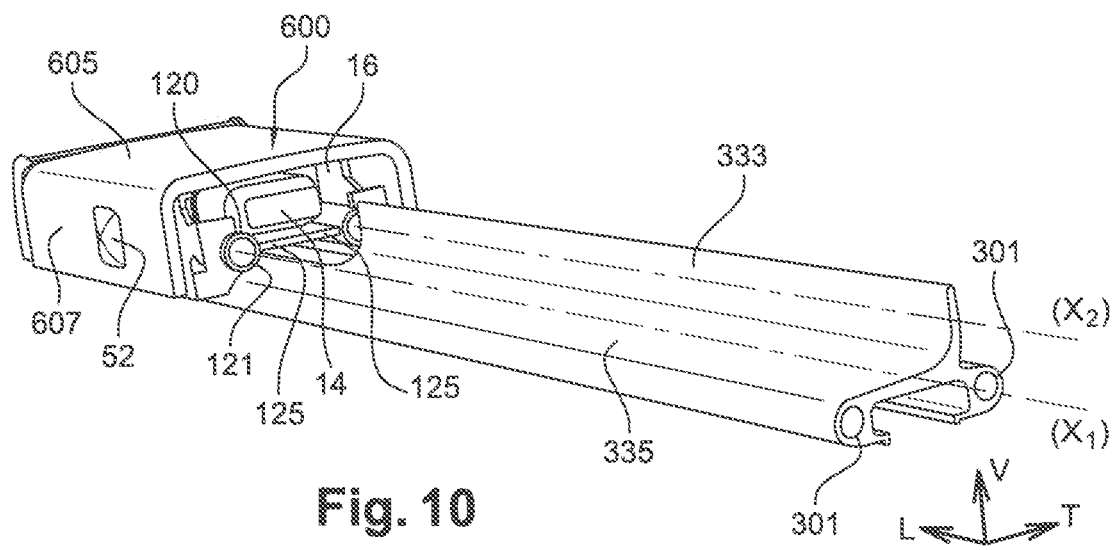
FIG. 10 is a perspective view of the connection module of FIG. 9 represented mounted on the windscreen wiper.
Figure 11:
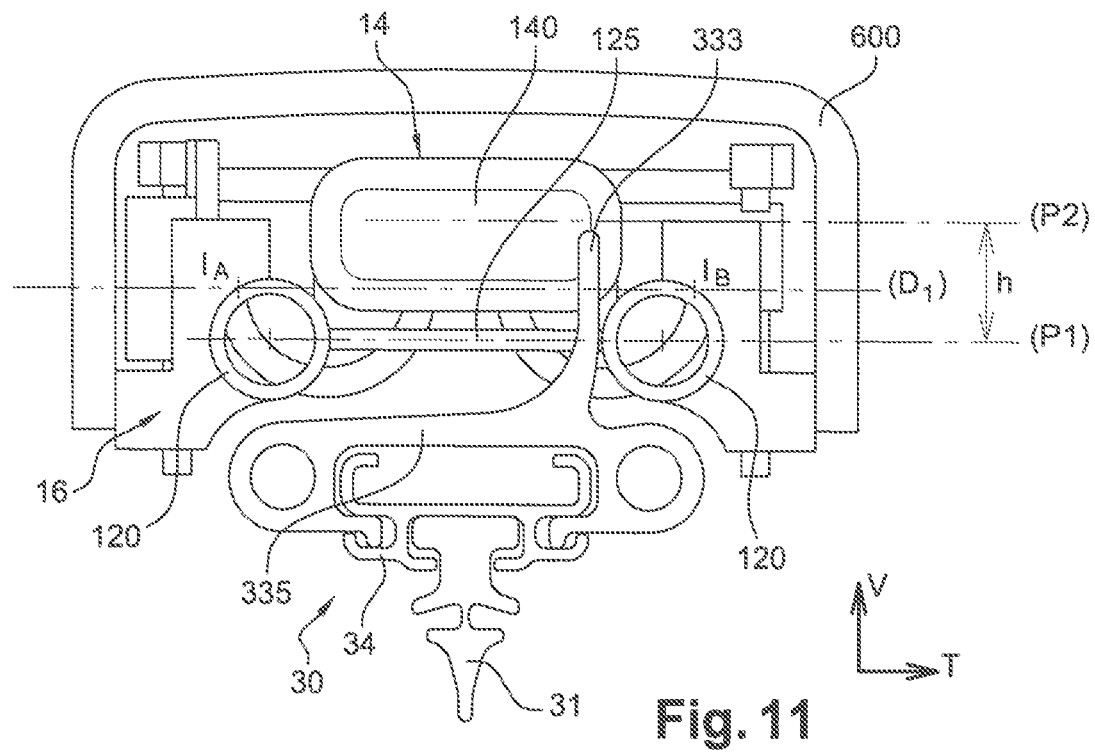
FIG. 11 is a cross-sectional view of the connection module of FIG. 10, the connection module being represented mounted on the windscreen wiper.

In a third embodiment, illustrated in FIGS. 9, 10 and 11, the hydraulic 12 and electrical 14 connectors are arranged such that the planes $P_1$ and $P_2$ are parallel or substantially parallel to one another. Here, the planes $P_1$ and $P_2$ do not coincide with one another. Furthermore, the main extension axes $(Y_1, Y_2)$ of the longitudinal routing channels of the electrical connector 14 extend longitudinally in a direction parallel to the routing ducts 120 of the hydraulic connector 12. Note that here the planes $P_1$ and $P_2$ are parallel to a plane coinciding with the axes L and T.

As can be seen in particular in FIG. 11, it will also be noted that the distance h which separates the planes $P_1$ and $P_2$ is less than a radius of the routing ducts 120 of the hydraulic connector 12.

Here, the material bridge 125 of the hydraulic connector 12 is entirely flat. The material bridge 125 extends here between the two routing ducts 120 completely parallel to the plane $P_1$. In particular here, the plane $P_1$ coincides with the material bridge 125. In other words, the material bridge 125 extends substantially along the plane $P_1$. Note that here the material bridge 125 extends parallel to a plane coinciding with the axes L and T.

Note also that, in the third embodiment, the adapter 50 comprises not one but two locking knobs 52 intended to cooperate mechanically with the connection cap 600 of the driving arm 60. The locking knobs 52 are here arranged on one and the other of the lateral walls 507 of the adapter 50. They are designed to cooperate mechanically with the immobilizing orifices arranged this time on the lateral walls 607 of the connection cap 600.

Figure 12:
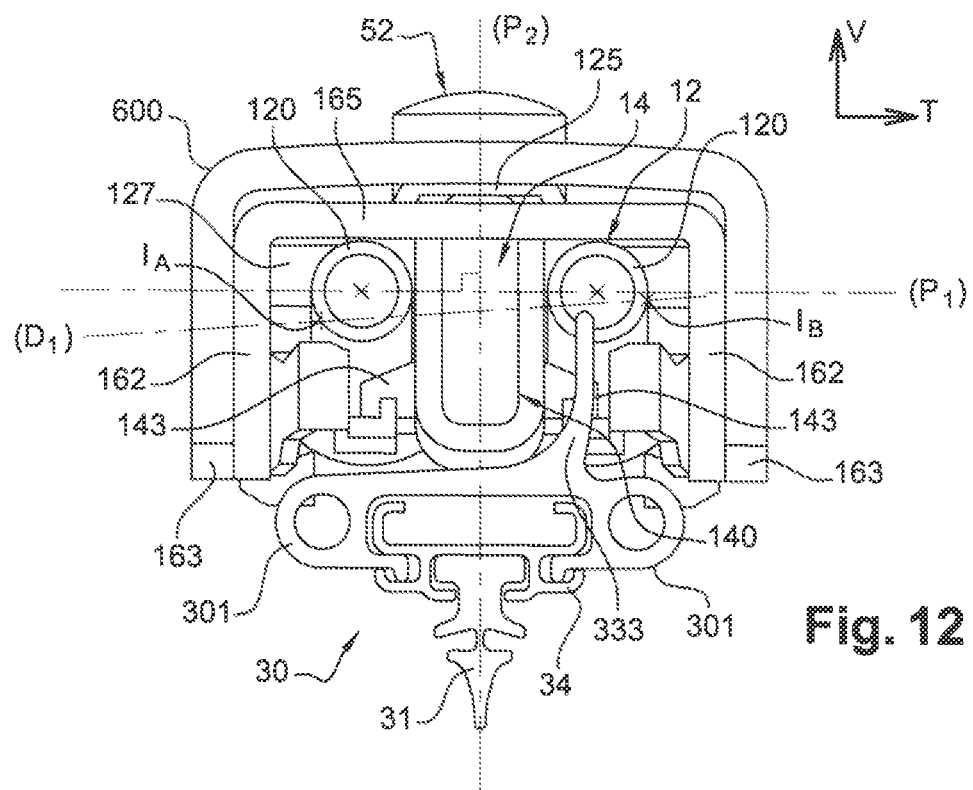
FIG. 12 is a cross-sectional view of a connection module according to a fourth embodiment according to the invention, the connection module being represented mounted on the windscreen wiper.

In a fourth embodiment illustrated in FIG. 12, the hydraulic 12 and electrical 14 connectors are arranged such that the planes $P_1$ and $P_2$ are at right angles to one another. Note that here the plane $P_1$ is parallel to a plane coinciding with the axes L and T. The plane $P_2$ is, for its part, parallel to a plane coinciding with the axes L and V. Here, the adapter 50 comprises a single locking knob 52 which is arranged on the upper flat part 505 of the adapter 50. The locking knob 52 cooperates mechanically with the flat part 607 of the connection cap 600.

Here, the material bridge 125 of the hydraulic connector 12 is substantially U-shaped with the branches separating slightly from one another. In particular, the material bridge 125 is designed so as to straddle the electrical connector 14. This design allows the hydraulic connector 12 to serve in particular as housing for the electrical connector 14 such that the latter is arranged between the routing ducts 120 of the hydraulic connector 12.

Note that the insulating body 140 of the electrical connector 14 is provided with attachment means 143 designed to cooperate mechanically with the rest of the connection module 10.

Figure 13:
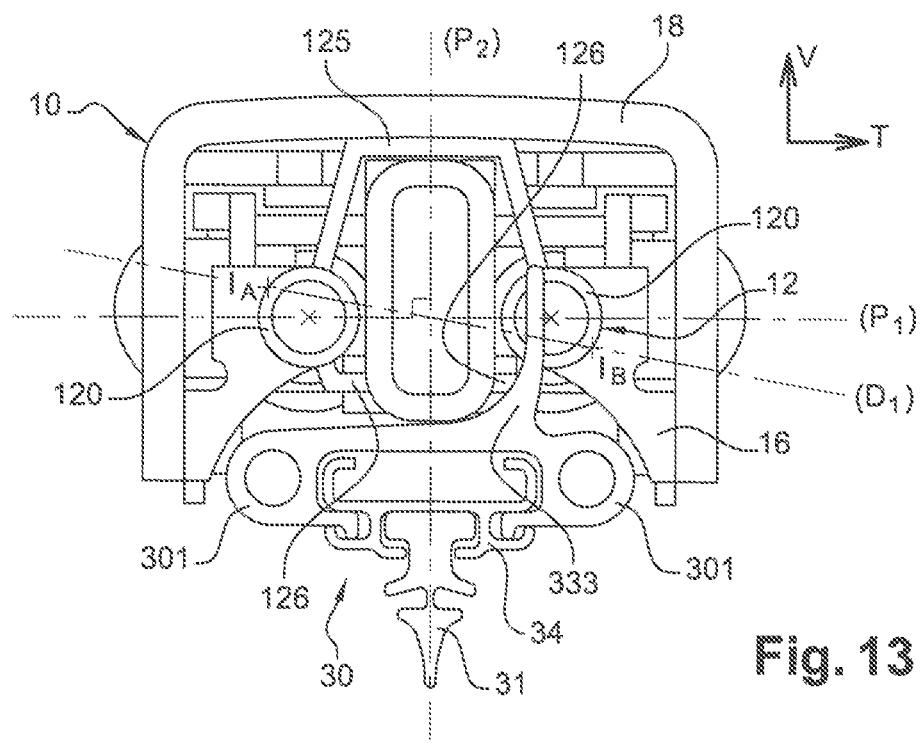
FIG. 13 is a cross-sectional view of a connection module according to a second embodiment of the invention, the connection module being represented mounted on the windscreen wiper.

In a fifth embodiment illustrated in FIG. 13, the hydraulic connector 12 is, for its part, provided with two attachment means 126 intended to cooperate mechanically with the electrical connector 14. In particular, each routing duct 120 of the hydraulic connector 12 is provided with one of the attachment means 126 of the hydraulic connector 12. Note that here the plane $P_1$ is parallel to a plane coinciding with the axes L and T. The plane $P_2$ is, for its part, parallel to a plane coinciding with the axes L and V.

In an embodiment that is not illustrated, as a variant, the hydraulic connector is at least partially arranged laterally between the two longitudinal routing channels of the electrical connector. The electrical connector is then for example split into two parts linked in particular to one another by a material bridge.

The invention claimed is:

1. A connection module for a wiper device of an outer surface of a window of a motor vehicle, the connection module configured to be arranged between a windscreen wiper and a driving arm, the connection module comprising:
   an electrical connector, called a first connector, comprising at least one longitudinal electrical routing channel that terminates at an electrical contact element configured to connect between the driving arm and the windscreen wiper; and
   a hydraulic connector, called a second connector, comprising two longitudinal hydraulic routing channels,
   wherein the electrical contact element of the first connector is at least partially arranged laterally between and substantially coplanar with the two longitudinal hydraulic routing channels of the second connector.

2. The connection module according to claim 1, wherein the at least one longitudinal electrical routing channel of the first connector is at least partially arranged laterally between the two hydraulic longitudinal routing channels of the second connector.

3. The connection module according to claim 1, wherein the two hydraulic longitudinal routing channels of the second connector extend substantially parallel to one another.

4. The connection module according to claim 3, wherein the at least one longitudinal electrical routing channel of the first connector is entirely arranged laterally between the two hydraulic longitudinal routing channels of the second connector.

5. The connection module according to claim 1, in which the first connector comprises two longitudinal electrical routing channels.

6. The connection module according to claim 5, in which the two longitudinal electrical routing channels of the first connector are parallel to one another.

7. The connection module according to claim 5, wherein the longitudinal routing channels of the first and second connectors each extend longitudinally along a main extension axis, the main extension axis of each of the at least one electrical longitudinal routing channel of the first connector, over at least a part of its length, coinciding or substantially coinciding with a plane $P_1$, the main extension axes of the hydraulic longitudinal routing channels of the second connector, at least over a part of their lengths, coinciding or substantially coinciding with a plane $P_2$.

8. The connection module according to claim 7, wherein the planes $P_1$ and $P_2$ are orthogonal.

9. The connection module according to claim 7, wherein the planes $P_1$ and $P_2$ are parallel.

10. The connection module according to claim 7, wherein the planes $P_1$ and $P_2$ substantially coincide.

11. The connection module according to claim 1, wherein the electrical connector comprises a main body disposed between the two longitudinal hydraulic routing channels of the hydraulic connector.

12. A windscreen wiper comprising:
   a wiper blade;
   a reinforcement; and
   a connection module arranged between the windscreen wiper and a driving arm, the connection module comprising:
      a hydraulic connector comprising two longitudinal hydraulic routing channels, and
      an electrical connector comprising at least one longitudinal electrical routing channel that terminates at an electrical contact element configured to connect between the driving arm and the windscreen wiper,
      wherein the electrical contact element of the electrical connector is at least partially arranged laterally between and substantially coplanar with the two longitudinal hydraulic routing channels of the hydraulic connector.

13. A connection module for a wiper device of an outer surface of a window of a motor vehicle, the connection module configured to be arranged between a windscreen wiper and a driving arm, the connection module comprising:
   an electrical connector called a first connector, comprising an insulating body pierced by two longitudinal ducts and two male pins prolonging the two longitudinal ducts, the two longitudinal ducts and the two male pins collectively forming a longitudinal routing channel of the electrical connector; and
   a hydraulic connector, called second connector, comprising two longitudinal hydraulic routing channels,
   wherein the first connector is at least partially arranged laterally between the two longitudinal routing channels of the second connector, and
   wherein the longitudinal electrical and hydraulic routing channels of the first and second connectors extend longitudinally along a main extension axis.

* * * * *